United States Patent Office 3,672,833
Patented June 27, 1972

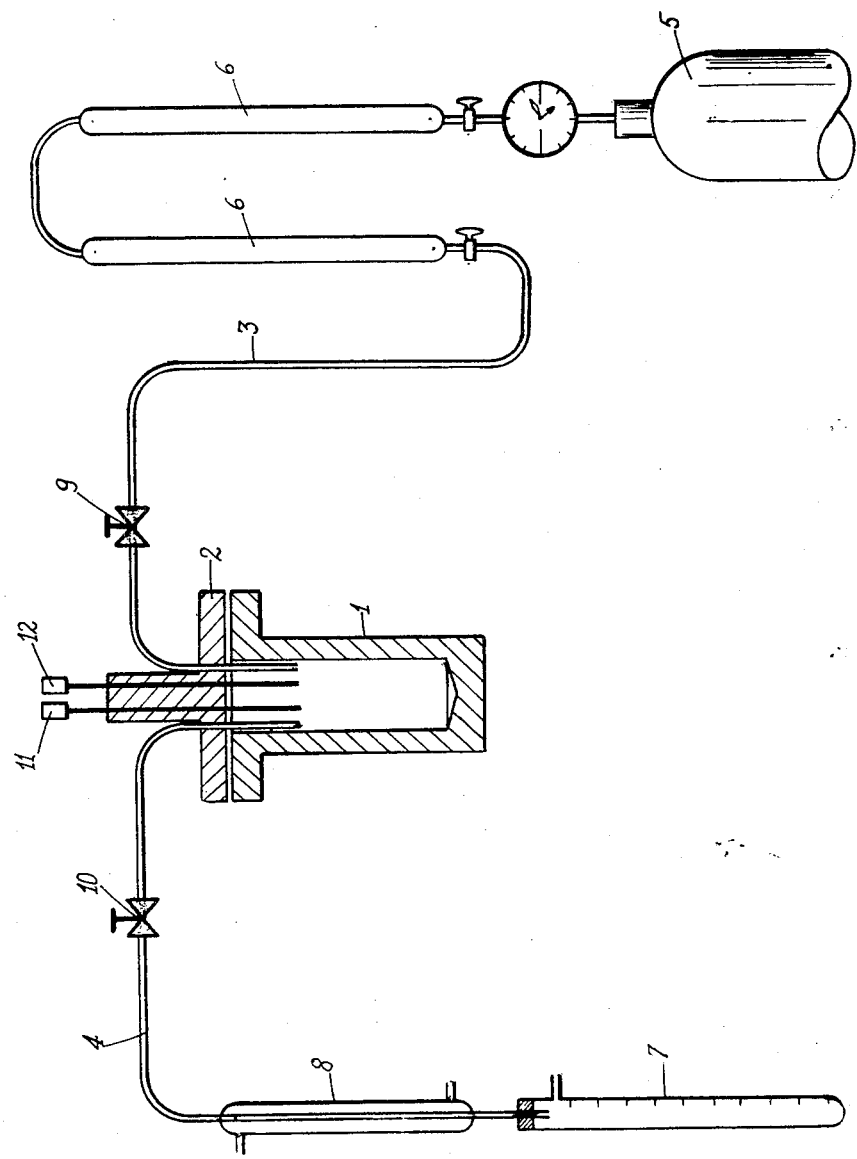
INVENTORS
STANISLAS JEAN TEICHNER
GILBERT ANDRE NICOLAON
BY Young & Thompson
ATTYS.

3,672,833
METHOD OF PREPARING INORGANIC AEROGELS
Stanislas Jean Teichner and Gilbert Andre Nicolaon, Lyon, France, assignors to Etat Francais represente par le Ministre des Armees Delegation Ministerielle pour l'Armement, Paris, France
Continuation-in-part of application Ser. No. 779,976, Nov. 29, 1968. This application Feb. 8, 1971, Ser. No. 113,246
Int. Cl. C01b *33/16, 33/14*
U.S. Cl. 23—182 R                    20 Claims

ABSTRACT OF THE DISCLOSURE

Silica aerogels are prepared by hydrolyzing a lower alkyl orthosilicate in an aliphatic alcohol having 1–4 carbon atoms with one to five times the stoichiometric quantity of water required to effect hydrolyzation. In a separate vessel, a supplementary amount of the same alcohol is added and the contents of both vessels are gradually heated to a temperature above the critical point. The pressure is gradually released and water and alcohol vapors are washed out with dry inert gas. The autoclave is then resealed and cooled to room temperature and the resulting aerogel is collected.

---

This application is a continuation-in-part of our copending application Ser. No. 779,976 filed Nov. 29, 1968 and now abandoned.

This invention relates to methods of preparing silica aerogels, i.e. silica gels wherein a gas or vapour is included as the continuous phase, that is, as the dispersion medium.

One aim of the invention is to develop methods of the aforementioned kind which are in accordance with practical requirements, inter alia with regard to their speed and the cost price, quality and special properties of the products, which can be used in novel manners.

It is already known to manufacture silica aerogels by precipitating the gel by acidifying a solution of sodium silicate, washing the gel in distilled water until all the acid and salts resulting from neutralisation have been eliminated, by replacing the water as completely as possible by an organic solvent and by drying the solvent-impregnated gel in an autoclave under hypercritical conditions.

However, the operation of washing the gel to remove the salts and the operation of replacing the water by the solvent are extremley long and, as a result, are extremely expensive in labour costs.

To clarify ideas, we note that the gel, after being precipitated by acidification from the silicate solution, needs to be washed about fifty times in order to eliminate all traces of salts and acid.

It is also known to prepare silica gels by forming a mixture consisting essentially of ethyl orthosilicate, water in a volume ratio of water to ethyl orthosilicate of at least 2, a strong mineral acid, other than such acid that is reactive with said silica, in said water in an amount sufficient to provide said water with a maximum pH of 1, and a sufficient amount of a material capable of functioning as an emulsifying agent in the presence of water having said pH value, agitating the mixture at suitable time and temperature until the mixture becomes a single clear phase as a solution, adding to the solution a water-soluble inorganic metal salt capable in sufficient amount of increasing the ionic strength of said water, continuing the agitation until dispersed oily droplets separate from the solution, providing further agitation of the mixture until said droplets harden to form solid, hard, substantially spherical beads, and separating said solid beads from said mixture, said addition of the ionizable salt being made in an amount sufficient to provide hardening of said droplets between the time of formation of the clear solution and the completion of said further agitation whereby the presence of said salt during said further agitation assists in the hardening of the droplets to form said solid beads.

However, it appears from the above that the structure of the resulting beads is not that of an aerogel.

It has been further proposed to produce a dry aerogel by a method which comprises the steps of first precipitating a colloidal substance in a liquid as a gel, substituting for the first liquid (for example, water) a second liquid having a lower critical temperature, confining the resulting product in a pressure vessel, applying heat thereto until the liquid in the gel has reached a temperature at which the surface tension of the liquid is materially reduced whereby to reduce the ultimate shrinkage of the gel when the liquid is allowed to evaporate, maintaining such temperature, and then releasing the vapor from the pressure vessel at a rate insufficient to injure the gel.

As it will appear from the following, the method according to the invention offers a number of advantages over the known processes, particularly with regard to the fastness and simplicity of carrying it out. It is not necessary to handle the gel while it is still immersed in the solvent. Moreover, due to the fact that the by-products of the reaction are volatile in the conditions of treatment applied, any washing of said gel is superfluous.

The method according to the invention of preparing silica aerogels by hydrolyzing a lower alkyl orthosilicate comprises dissolving the same in a lower, water-miscible alkanol, subsequently adding to the resulting solution water, adding in a separate vessel a supplementary amount of said lower alkanol, gradually heating the contents of both vessels in an autoclave until the temperature reached is above the critical point, then gradually releasing the pressure and flushing out the water and alkanol vapours with a stream of a dry, inert gas and again sealing the autoclave and cooling it until the ambient temperature is reached, whereupon the resulting aerogel is collected.

Under the wording of a lower alkyl orthosilcate is meant an orthosilicate the alkyl group of which contains one or two carbon atoms; i.e. either methyl orthosilicate or ethyl orthosilicate. Both compounds are commercially available.

Under the wording of a lower, water-miscible alkanol is meant an aliphatic alcohol containing one to four carbon atoms bound as an alkyl chain which is either straight or branched. In other words, said alkanol can be selected from the following ones: methanol, ethanol, n-propanol, isopropanol, n-butanol, isobutanol, sec.-butanol, and tert.-butanol.

Advantageously, the amount of alkyl orthosilicate used is substantially comprised between 5 and 30% by volume of the quantity of alkanol. Preferably, the quantity is of the order of 10%, the proportion which has given the best results.

Hydrolysis of the above defined mixture can be effected either in an acidic, neutral or basic medium. In the first case and by virtue of its volatile nature, it has been found preferable to use acetic acid as acidifying compound. In the latter case and for the same reason, ammonia is used as alkalising compound.

The amount of water used to hydrolyse the lower alkyl orthosilicate is advantageously comprised between one and five times the stoichiometric quantity when the medium is acid (by adding acetic acid) or neutral; if the medium is basic (by adding $NH_3$), gelification occurs at the ordinary temperature when the quantity of water is more than twice the stoichiometric quantity. This premature gelification is not a disadvantage.

The stoichiometric quantity of water is calculated after the equation

[1] $$Si(OR)_4 + 2H_2O \rightarrow SiO_2 + 4ROH$$

wherein R represents the alkyl radical of the alkyl orthosilicate, i.e. a methyl or ethyl radical.

Temperature and pressure conditions which reach or even exceed the critical point of the solvent can be obtained advantageously by placing the solution of alkyl orthosilicate in an autoclave in which an additional quantity of solvent is also placed, preferably without mixing it with the solution of orthosilicate, but sufficient to reach the critical point of the solvent, allowing for the volume of the autoclave.

The autoclave is sealed as soon as the solvent and the solution of alkyl orthosilicate have been introduced. The temperature is then raised in as linear a manner as possible until it is above the critical temperature of the solvent after which the solvent vapour is evacuated. When pressure has returned to normal, the autoclave is flushed out with an inert, dry gas in order to remove all the vapours that can condense. The temperature is then brought back to normal, after the autoclave valves have been closed to prevent any atmospheric water vapour from condensing.

A more detailed description will now be given of various embodiments of the invention with reference to the accompanying drawing, which is a diagram of apparatus for working the method.

The apparatus comprises an autoclave 1 which can be closed by a lid 2 and is connected by a pipe 3 via drying columns 6 to an inert gas reservoir 5, and by a pipe 4 to a vessel 7 for holding the solvent, after it has condensed in a condenser 8. Valves 9 and 10 are disposed on pipes 3 and 4 respectively. A thermoprobe 11 and a pressure gauge 12 show the variations of temperature and pressure inside autoclave 1.

A detailed description will now be given of a numerical example of the method according to the invention, using the apparatus in the drawing.

500 ml. methyl orthosilicate were dissolved in 4,500 ml. methanol. The resulting solution contained approximately 10% of methyl orthosilicate. The solution was cooled to 0° C., after which a quantity of water was added equal to from two to five times the stoichiometric quantity required for reaction 1.

$$Si(OCH_3)_4 + 2H_2O \rightarrow SiO_2 + 4CH_3OH \quad (1)$$

This solution was poured into a vessel which was placed in autoclave 1, which had an internal volume of 300 l. Another vessel containing 95 l. methanol was placed inside the autoclave along with the vessel containing the solution. The quantity of methanol was sufficient for the critical pressure to be exceeded when the temperature rose above the critical point.

The autoclave was sealed and the temperature was raised from 20° C. to 260° C. (18° C. above the critical temperature) in 2 hours 30 minutes, the temperature being increased at the rate of 1.6° C./minute. At the end of this period, the methanol vapour was evacuated by opening valve 10. The vapour was collected in reservoir 7.

When pressure had returned to atmospheric pressure (the evacuation of vapour took about 30 minutes), valve 9 was opened and the autoclave was flushed out with about 3 m.³ of nitrogen, valve 10 also being left open. Valves 9 and 10 were then closed and the autoclave was cooled to the ambient temperature. The autoclave was then opened and about 200 g. of aerogel were withdrawn, having a volume of about 5 l. The whole process lasted about 4 hours.

Aerogels obtained in the manner cited are remarkable for their porosity. The porosity can be studied e.g. by adsorption of gases at low temperature and by mercury porosimetry.

It has been shown that, in general, the adsorption of argon at $-195°$ C. can be used to determine the volume of the micropores (pore radius less than 100 A.). The volume of pores measured by the adsorption of nitrogen at the same temperature is equal to the volume of the micropores plus the volume of the middle-sized pores (pore radius $<420°$ A.). The volume of pores determined by mercury penetration is equal to the volume of the macropores (pore radius $>290°$ A.).

The general recation for the precipitation of silica is given by cited Equation 1. Actually, however, the substance precipitated is a relatively polycondensed polysilicic acid. As a result, the resulting aerogel does not have the formula $SiO_2$ but rather the formula $SiO_2$, $nH_2O$, with $n<2$. In the case where $n=2$, the reaction is limited to the formation of monomeric silicic acid $Si(OH)_4$, according to Equation 2:

$$Si(OCH_3)_4 + 4H_2O \rightarrow Si(OH)_4 + 4CH_3OH \quad (2)$$

Since the polycondensation of the afore-mentioned acid, which gives silica gel $SiO_2$ is accompanied by the elimination of water, aerogels prepared under stoichiometric conditions corresponding to reaction 2 lose a little water when treated in the autoclave.

It has been shown that in an acid medium (0.175 N acetic acid) precipitation is very incomplete when the exact stoichiometric quantity of water is used (Equation 1). The aerogel obtained in these conditions by hydrolysis of a 10% solution of methyl orthosilicate in methanol (gel $E_1$) has a very low porosity compared with aerogels obtained with an excess of water. When the quantity of water used is twice the stoichiometric quantity for reaction 1, the resulting aerogel (No. 2) occupies the complete volume of the alcoholic methyl orthosilicate solution initially placed in the autoclave, and its texture is considerably improved. Gels have been prepared having a total porosity of the order of 18 cm.³/g. (gel No. 3). When the concentration of water is excessive (gel No. 4), there is a marked decrease in porosity.

The results in the following Table I show that all the textural properties of aerogels obtained by the cited method pass through a maximum when the quantity of water used is between two and five times the stoichiometric quantity for reaction 1, i.e. when the ratio $H_2O/Si(OCH_3)_4$ is between 4 and 10.

TABLE I
(Precipitation in an acid medium)

| Aerogel example No. | $\frac{H_2O}{Si(OCH_3)_4}$ | S, m.²/g. | $V_{pA}$, cm.³/g. | $V_{pN}$, cm.³/g. | $V_P$, cm.³/g. |
|---|---|---|---|---|---|
| 1 | 2 | 380 | 0.15 | 0.18 | 2.7 |
| 2 | 4 | 865 | 0.72 | 1.82 | 11.6 |
| 3 | 10 | 688 | 0.62 | 1.72 | 17.3 |
| 4 | 20 | 405 | 0.40 | 1.52 | 7.2 |

In the table:

S=specific surface measured with nitrogen by the B.E.T. method (cf. S. Brunauer, P. H. Emmett and Teller, J. Am. Chem. Soc. (1938), 60, p. 309)

$V_{pA}$=volume of pores measured with argon.
$V_{pN}$=volume of pores measured with nitrogen, and
$V_P$=volume of pores determined by mercury penetration.

The results in Table II show that a similar development occurs in a neutral medium. The porosity accessible to adsorbed gases ($V_{pA}$ and $V_{pN}$) varies in dependence on the quantity of water introduced, in the same manner as in an acid medium. On the other hand, the volume of the large pores ($V_P$) is not affected by a large excess of water (Table II).

TABLE II (Precipitation in a neutral medium)

| Aerogel example No. | $\frac{H_2O}{Si(OCH_3)_4}$ | S, m.²/g. | $V_{pA}$, cm.³/g. | $V_{pN}$, cm.³/g. | $V_P$, cm.³/g. |
|---|---|---|---|---|---|
| 5 | 2 | 366 | 0.23 | 0.40 | 7.9 |
| 6 | 4 | 796 | 0.71 | 1.53 | 10.7 |
| 7 | 10 | 590 | 0.53 | 1.58 | 15.4 |
| 8 | 20 | 523 | 0.54 | 1.48 | 16.3 |

In a basic medium (0.5 N ammonia), the precipitation is considerably less than in a neutral or acid medium, even when the water is restricted to the stoichiometric quantity as shown by the weights of gel obtained.

The initial silica sol obtained under the last-mentioned conditions is much less stable, and as soon as the concentration of water is more than twice the stoichiometric quantity for reaction 1, some of the silica precipitates as soon as methyl orthosilicate is introduced into the hydrated methanol. For this reason, the effect of the water concentration in an alkaline medium cannot be studied if the ratio $H_2O/Si(OCH_3)_4$ is greater than 4. It is still possible to prepare aerogels, however, if the substance introduced into the autoclave is not a homogeneous liquid solution but a heterogeneous solution which has been partly gelified or precipitated.

TABLE III (Precipitation in an alkaline medium)

| Aerogel example No. | $\frac{H_2O}{Si(OCH_3)_4}$ | S, m.²/g. | $V_{pA}$, cm.³/g. | $V_{pN}$, cm.³/g. | $V_P$, cm.³/g. |
|---|---|---|---|---|---|
| 9 | 2 | 820 | 0.61 | 1.64 | 4.6 |
| 10 | 4 | 697 | 0.51 | 2.06 | 5.3 |

The results in Table III show that aerogels obtained in an alkaline medium have considerable lower macroporosity ($V_P$) than aerogels precipitated in a neutral or acid medium although the microporosity ($V_{pN}$ and $V_{pA}$) is comparable. The aerogels have a very peculiar appearance. Aerogels prepared by the cited method in a neutral or acid medium are white and opaque, but aerogels obtained in an alkaline medium are colourless and completely transparent, even up to a thickness of approximately 1 centimetre.

A study was also made of the effect of the concentration of methyl orthosilicate in a slightly acid medium (0.175 N acetic acid) in the presence of a quantity of water equal to the stochiometric quantity for reaction 2.

TABLE IV

| Aerogel example No. | $Si(OCH_3)_4$ percentage by volume | S, m.²/g. | $V_{pA}$, cm.³/g. | $V_{pN}$, cm.³/g. | $V_P$, cm.³/g. | $d_a$, g./cm.³ |
|---|---|---|---|---|---|---|
| 11 | 5 | 524 | 0.23 | 0.21 | 1.2 | 0.27 |
| 2 | 10 | 865 | 0.72 | 1.82 | 11.6 | 0.04 |
| 12 | 20 | 805 | 0.68 | 1.55 | 10.0 | 0.10 |
| 13 | 30 | 774 | 0.60 | 1.46 | 4.0 | 0.16 |

In the table:

$d_a$ = apparent density of solid.

The results in Table IV show that in the case of an aerogel prepared from a solution of 5% by volume of methyl orthosilicate in methanol microporosity and macroporosity are considerably lower than for the other solids. This is due to the fact that, if the concentration of methyl orthosilicate is less than 10%, the solid withdrawn from the autoclave occupies a considerably smaller volume than the initial solution. However, as soon as the concentration reaches 10%, the dry gel occupies very nearly the volume of the initial solution, with the result that its apparent density is substantially proportional to the concentration of methyl orthosilicate, as shown by the experimental results given in the last column of Table IV.

As can be expected, the pore volumes, measured by gas adsorption or mercury porosimetry, decrease when the concentration of methyl orthosilicate increases from 10 to 30%. On the other hand, the specific surface is not much affected by the last-mentioned factor (Table IV).

A study was also made of the thermal stability of aerogels prepared according to the invention. To this end, an aerogel precipitated by hydrolysis of a solution of 10% methyl orthosilicate in a 0.175 N acetic acid medium in the presence of a stoichiometric quantity of water for reaction 2 was thermally treated for 8 hours in air at temperatures between 300 and 900° C.

It was found that heating to 500° C. considerably improves the macroporosity of aerogels when the measure is effected in mercury (16.5 cm.³/g. instead of 11.1). The volume of pores accessible to mercury was not noticeably lower than that of the initial solid until the temperature of treatment exceeded 700° C.

On the other hand, the porosity accessible to adsorbed gases ($V_{pN}$ and $V_{pA}$) decreased progressively when the temperature increased. The results are shown in the following Table V.

TABLE V

Effect of thermal treatment for 8 hours in air on the texture of a silica aerogel prepared from methyl orthosilicate

| Treatment temperature (° C.) | S, m.²/g. | $V_{pA}$, cm.³/g. | $V_{pN}$, cm.³/g. | $V_P$, cm.³/g. |
|---|---|---|---|---|
| Initial aerogel | 860 | 0.71 | 1.81 | 11.1 |
| 300 | 1,004 | 0.70 | 1.48 | 13.1 |
| 500 | 800 | 0.56 | 1.26 | 16.5 |
| 700 | 477 | 0.37 | 0.90 | 10.5 |
| 900 | 162 | 0.14 | 0.30 | 6.5 |

The cited data show that the macropores of silica aerogels prepared from methyl orthosilicate have good thermal stability up to 700° C.

The pore volume of aerogels treated to 700° C., measured by mercury penetration, is not appreciably lower than for the aerogel used as starting material, in spite of the marked decrease in porosity accessible to adsorbed gases ($V_{pN}$, $V_{pA}$ and S). The apparent density and appearance of the aerogel are also practically unchanged, provided the heating temperature does not exceed 700° C. The afore-mentioned solids are particularly suitable as heat insulators over a very wide temperature range (−200° C. to +700° C.).

Aerogels prepared in an autoclave in the presence of a lower alkanol are relatively hydrophobic, as silicic acid is then re-esterified to some extent by said alkanol. They absorb only a moderate amount of water vapour and when the re-esterification rate is considerable, for instance after prolonged heating under pressure, they are not wetted by water.

The following examples relate to a second embodiment of this invention wherein the alkyl orthosilicate is ethyl orthosilicate.

Example 14 (hydrolysis in neutral medium)

25 grams ethyl orthosilicate were dissolved in 225 grams ethanol. The resulting solution contained approximately 10 percent by weight of ethyl orthosilicate. The solution was cooled to 0° C., after which 18 grams water were added, a quantity which amounts to 8 moles water per mole ethyl orthosilicate. The solution was introduced in an autoclave which was sealed immediately and progressively heated within three hours, from 20° C. to 290° C., the temperature being increased at the rate of 1.5° C./minute.

As soon as the latter temperature was reached, the ethanol vapour was evacuated. When temperature had returned to ambient temperature under purging the autoclave by blowing dry nitrogen therethorugh, the dry aerogel was withdrawn. Its specific surface was $S_N=815$ m.²/g. (as measured by nitrogen adsorption) and its volume of pores was $V_P=15$ ml./g.

Example 15 (hydrolysis in acidic medium)

25 grams ethyl orthosilicate are dissolved in 225 grams ethanol. The resulting solution was added with 18 grams water, i.e. 8 moles per mole of orthosilicate. Finally, there was added 2.9 ml. pure acetic acid (normality of the resulting solution: 0.175 N).

The treatment was effected in an autoclave in the manner as described in Example 14.

The resulting silica aerogel has the following characteristics $$S_N=720 \text{ m.}^2/\text{g.}; V_P=16.3 \text{ cm.}^3/\text{g.}$$

The following examples relate to the use of lower alkanols other than those of which the orthosilicates to be used are derived, that is, other than methanol and ethanol.

Example 16

25 grams methyl orthosilicate were dissolved in 225 grams n-propanol. The resulting alcoholic solution contained 10 percent by weight of silicium alkoxide. To this solution were added 24 grams water, i.e. 8 moles per mole of methyl orthosilicate.

The treatment was effected in an autoclave in the same manner as described in the foregoing examples.

The silica aerogel thus obtained had a specific surface $S=860$ m.²/g. and a volume of pores $V_P=17.5$ cm.³/g.

Example 17

The operation was carried out in the same manner as described in Example 16 with the exception that n-propanol was replaced with a same amount of isopropanol.

The silica aerogel thus obtained had a specific surface $S=680$ m.²/g. and a volume of pores $V_P=16.1$ cm.³/g.

Example 18

The reaction was carried out in the manner described in Example 16 with the exception that n-propanol was replaced with a same amount of n-butanol. A silica aerogel was obtained which had the following texture:

$$S=740 \text{m.}^2/\text{g.}; V_P=15.2 \text{ cm.}^3/\text{g.}$$

Example 19

The reaction was carried out in the manner described in Example 16 with the exception that n-propanol was replaced with a same amount of sec.-butanol.

A silica aerogel was obtained which had the following texture:

$$S=860 \text{ m.}^2/\text{g.}; V_P=17.2 \text{ cm.}^3/\text{g.}$$

Example 20

The reaction was carried out in the manner described in Example 16 with the exception that n-propanol was replaced with a same amount of tert.-butanol.

A silica aerogel was obtained which had the following texture:

$$S=635 \text{ m.}^2/\text{g.}; V_P=15.1 \text{ cm.}^3/\text{g.}$$

The above-described Examples 14 to 20 have been carried out in the manner of Example 1 by placing inside the autoclave a separate vessel containing an amount of the aliphatic alcohol employed, such that the critical pressure is exceeded when the temperature rises above the critical point.

The silica aerogels prepared in the above-described manner all have the property of gelifying organic liquids or aqueous solutions when added in very small proportions (approximately 5 percent by weight of said liquids or solutions. They can also be used to increase the viscosity of such liquids.

Whatever embodiment, therefore, is used, a method is obtained for preparing silica aerogels having properties which have been sufficiently described hereinbefore and which have numerous advantages over known aerogels, inter alia the elimination of the operations of washing the gel and of substituting a solvent for the water impregnating the gel.

The invention, of course, is not limited to the cited embodiments but covers all variants.

The invention is hereby claimed as follows.

We claim:

1. A method of preparing silica aerogels by hydrolyzing a lower alkyl orthosilicate which comprises dissolving the same in an aliphatic alcohol having one to four carbon atoms, subsequently adding to the resulting solution water in an amount at least equal to the amount required to hydrolyze the lower alkyl orthosilicate, adding in a separate vessel a supplementary amount of said alcohol, gradually heating the contents of both vessels in an autoclave until the temperature reached is above the critical point, then gradually releasing the pressure and flushing out the water and alcohol vapors with a stream of a dry, inert gas and again sealing the autoclave and cooling it until the ambient temperature is reached, whereupon the resulting aerogel is collected.

2. A method according to claim 1, wherein said lower alkyl orthosilicate is selected from the group consisting of methyl orthosilicate and ethyl orthosilicate.

3. A method according to claim 2, wherein said lower alkyl orthosilicate is methyl orthosilicate.

4. A method according to claim 1, wherein said alcohol is methanol.

5. A method according to claim 1, wherein said alcohol is ethanol.

6. A method according to claim 1, wherein said alcohol is n-propanol.

7. A method according to claim 1, wherein said alcohol is isopropanol.

8. A method according to claim 1, wherein said alcohol is n-butanol.

9. A method according to claim 1, wherein said alcohol is isobutanol.

10. A method according to claim 1, wherein said alcohol is sec.-butanol.

11. A method according to claim 1, wherein said alcohol is tert.-butanol.

12. A method according to claim 1, wherein said dry inert gas is nitrogen.

13. A method according to claim 3, wherein said dry inert gas is nitrogen.

14. A method according to claim 1, wherein hydrolysis is effected in neutral medium.

15. A method according to claim 1, wherein hydrolysis is effected in acidic medium.

16. A method according to claim 1, wherein hydrolysis is effected in the presence of acetic acid.

17. A method according to claim 1, wherein hydrolysis is effected in alkaline medium.

18. A method according to claim 1, wherein hydrolysis is effected in the presence of ammonia.

19. A method of preparing silica aerogels by hydrolyzing methyl orthosilicate which comprises dissolving the same in methanol, subsequently adding to the resulting solution water in an amount at least equal to the stoichiometrical amount, adding in a separate vessel a supplementary amount of methanol, gradually heating the contents of both vessels in an autoclave until the temperature reached is above the critical point, then gradually releasing the pressure and flushing out the water and methanol vapors with a stream of a dry, inert gas and again sealing the autoclave and cooling it until the ambient temperature is reached, and then collecting the resulting aerogel.

20. A method according to claim 19 wherein said dry inert gas is nitrogen.

References Cited

UNITED STATES PATENTS

| | | | |
|---|---|---|---|
| 3,236,594 | 2/1966 | Ray | 23—182 R |
| 3,131,072 | 4/1964 | Tauilli | 106—306 |
| 3,165,379 | 1/1965 | Schwartz | 23—182 R |
| 2,269,059 | 1/1942 | McLachlan, Jr. | 23—182 R X |
| 3,321,276 | 5/1967 | Burzynski et al. | 23—182 R |
| 3,354,095 | 11/1967 | Burzynski et al. | 252—316 |
| 3,146,252 | 8/1964 | Emblem et al. | 260—448.8 |
| 2,093,454 | 9/1937 | Kistler | 23—182 R |
| 2,285,449 | 6/1942 | Marshall | 23—182 R UX |
| 2,757,073 | 7/1956 | Drexel | 23—182 R |

EDWARD STERN, Primary Examiner

U.S. Cl. X.R.

252—315, 317

UNITED STATES PATENT OFFICE
CERTIFICATE OF CORRECTION

Patent No. 3,672,833     Dated June 27, 1972

Inventor(s) Stanislas Jean Teichner et al.

It is certified that error appears in the above-identified patent and that said Letters Patent are hereby corrected as shown below:

In the heading of the patent, insert -- Claims priority, application France, Nov. 30, 1967 PV 130,147 --.

Signed and sealed this 3rd day of April 1973.

(SEAL)
Attest:

EDWARD M. FLETCHER, JR.                ROBERT GOTTSCHALK
Attesting Officer                      Commissioner of Patents

UNITED STATES PATENT OFFICE
CERTIFICATE OF CORRECTION

Patent No. 3,672,833                    Dated June 27, 1972

Inventor(s)  Stanislas Jean Teichner et al.

It is certified that error appears in the above-identified patent and that said Letters Patent are hereby corrected as shown below:

In the heading of the patent, insert -- Claims priority, application France, Nov. 30, 1967  Pv 130,417 --.

This certificate supersedes Certificate of Correction issued April 3, 1973.

Signed and sealed this 20th day of November 1973.

(SEAL)
Attest:

EDWARD M. FLETCHER, JR.                RENE D. TEGTMEYER
Attesting Officer                      Acting Commissioner of Patents